United States Patent [19]

Hoashi et al.

[11] Patent Number: 4,583,371
[45] Date of Patent: Apr. 22, 1986

[54] HYDROSTATIC DRIVE ARRANGEMENT

[75] Inventors: Kenzo Hoashi, Yokohama; Koichi Morita; Kazuo Matsuda, both of Kawasaki, all of Japan

[73] Assignee: Kabushiki Kaisha Komatsu Seisakusho, Tokyo, Japan

[21] Appl. No.: 713,096

[22] Filed: Mar. 18, 1985

Related U.S. Application Data

[63] Continuation of Ser. No. 440,496, Nov. 10, 1982, abandoned.

[51] Int. Cl.⁴ ............................................. F15B 11/22
[52] U.S. Cl. ................................. 60/426; 180/6.48
[58] Field of Search ............... 60/420, 421, 426, 430, 60/468, 484, 486, 494; 91/461, 515, 516; 137/100; 180/6.48

[56] References Cited

U.S. PATENT DOCUMENTS

| | | | |
|---|---|---|---|
| 3,091,930 | 6/1963 | Thoma et al. | 60/426 |
| 3,576,106 | 4/1971 | Nowicki | 60/426 |
| 3,655,004 | 4/1972 | Hoashi | 180/6.48 |
| 3,744,584 | 7/1973 | Swift | 180/6.48 |
| 3,908,374 | 9/1975 | Habiger | 60/420 |

*Primary Examiner*—Charles T. Jordan
*Assistant Examiner*—Richard Klein
*Attorney, Agent, or Firm*—Frost & Jacobs

[57] ABSTRACT

A hydrostatic drive arrangement for a vehicle providing synchronized rotation of a pair of output drive shafts including a pair of transmissions each having a closed loop hydraulic circuit hydraulically interconnecting a variable displacement pump and a hydraulic motor, and a pressure responsive hydraulic synchronizing valve disposed between the hydraulic circuits and normally open to permit interflow of fluid between the hydraulic circuits with the valve being responsive to fluid pressure in one of the hydraulic circuits to restrict flow therethrough when the fluid pressure in the one hydraulic circuit exceeds a predetermined value.

5 Claims, 1 Drawing Figure

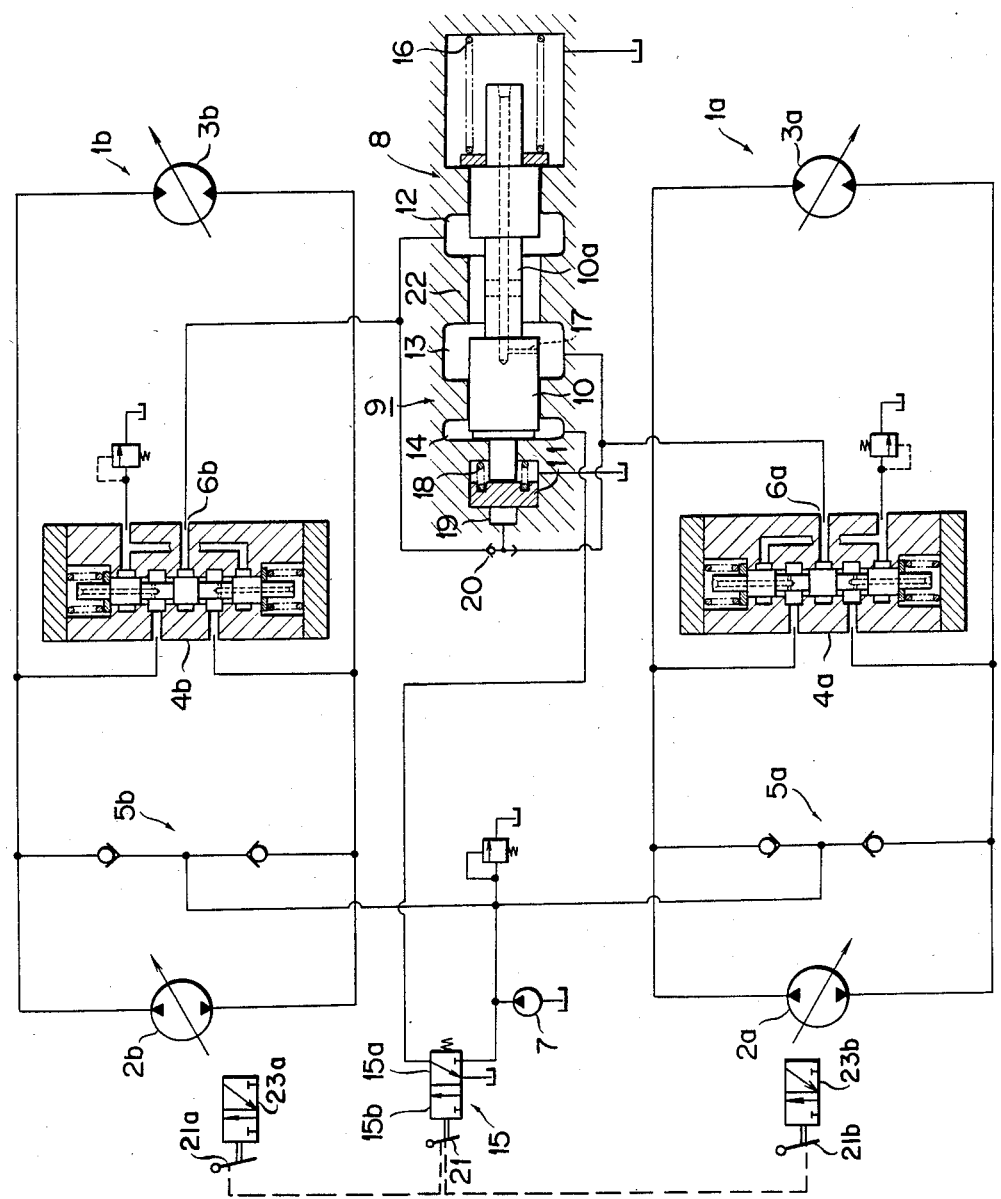

HYDROSTATIC DRIVE ARRANGEMENT

This application is a continuation of application Ser. No. 440,496, filed Nov. 10, 1982, now abandoned.

BACKGROUND OF THE INVENTION

This invention relates to a hydrostatic drive arrangement for a hydrostatically driven vehicle having left and right hydrostatic transmissions.

In the hydrostatically driven vehicle, a difference in efficiency between the left and right hydrostatic transmissions will result in a difference in the number of output revolutions between the left and right hydraulic motors which in turn causes a turning of the vehicle to either side when it is making a straight drive on. Consequently, a problem will occur that in order to prevent the turn of the vehicle to either side it becomes necessary, in operation, to make a steering operation which is otherwise unnecessary.

To eliminate the above-mentioned problem, such proposals as disclosed in the U.S. Pat. Nos. 3,908,374 and 3,655,004 have been made; however, both of them have the following disadvantages and cannot be recognized as complete or satisfactory ones.

First, in vehicles provided with a hydrostatic drive arrangement as disclosed in the U.S. Pat. No. 3,908,374, there is a possibility that the following phenomenon occurs.

If a steering operation is made, for example, to the left transmission when synchronizing valve is under bypass condition (that is; the circuit pressure is lower than a preset value), the hydraulic fluid will flow from the higher fluid pressure conduit of the right transmission into the higher fluid pressure conduit of the left transmission. Such a condition prevents the steering operation of the vehicle, and so it becomes impossible to make a smooth steering of the vehicle.

If the steering operation is continued further, the pressure within the conduit of the right transmission on the higher pressure side thereof will rise due to the resistance caused by the left transmission thereby shifting the synchronizing valve to a blocking position. As a result, the hydraulic fluid flow from the right transmission to the left transmission is interrupted so that the vehicle will commence a quick turn.

Accordingly, the above-mentioned prior art hydrostatic drive arrangement has been disadvantageous in that at the time of commencement of steering operation the vehicle cannot be turned as desired, whilst when the steering operation is continued further beyond a certain extent the vehicle will turn suddenly, and such unexpected turn of the vehicle is not preferrable for the operator.

Whilst, in the hydrostatic drive arrangement disclosed in the U S. Pat. No. 3,655,004, such a phenomenon will not occur and straight drive and steering of the vehicle can be conducted smoothly; however, it has been disadvantageous in that there is provided a clutch for mechanically connecting and disconnecting the output shafts of the hydraulic motors thus making the construction thereof complicated and increasing the cost thereof.

SUMMARY OF THE INVENTION

It is therefore an object of the present invention to provide a hydrostatic drive arrangement for a vehicle which overcomes the above noted problems of prior art.

Another object of the present invention is to provide a hydrostatic drive arrangement for a vehicle which is able to equalize fluid pressure in both hydrostatic transmissions and therefore to provide a reliable straight run capability even if heavy loads are imposed on one of the hydrostatic transmissions.

A further object of the present invention is to provide a hydrostatic drive arrangement for a vehicle which automatically affords independent operation of the respective hydrostatic transmissions in steering operations.

In accordance with an aspect of the present invention, there is provided a hydrostatic drive arrangement for a vehicle, comprising: a pair of variable speed hydrostatic transmissions each having a hydraulic pump, a hydraulic motor and a closed loop hydraulic circuit interconnecting said pump and said motor for communicating fluid therebetween; synchronizing valve means interconnected between said hydraulic circuits of said transmissions normally permitting interflow of fluid between said hydraulic circuits for synchronizing the output speeds of said transmissions when the fluid pressure in said hydraulic circuits is below a predetermined value, said synchronizing valve means being responsive to fluid pressures in said hydraulic circuits to restrict interflow therebetween when the fluid pressure in one of said hydraulic circuits exceeds said predetermined value; a hydraulic charge pump connected with said closed loop hydraulic circuits for replenising fluid lost from said hydraulic circuits; and selector valve means disposed between said hydraulic charge pump and said synchronizing valve means for selectively communicating said synchronizing valve means with said hydraulic charge pump and drain, said selector valve means normally blocking communication between said synchronizing valve means and said hydraulic charge pump and establishing communication between said synchronizing valve means and the drain thereby permitting interflow of fluid between said hydraulic circuits and being responsive to a steering operation of the vehicle to establish communication between said synchronizing valve means and said hydraulic charge pump thereby blocking interflow of fluid between said hydraulic circuits.

The above and other objects, features and advantages of the present invention will be readily apparent from the following description taken in conjunction with the accompanying drawing.

BRIEF DESCRIPTION OF THE DRAWING

The sole FIGURE is a schematic drawing with valve portions thereof shown in section depicting a hydrostatic drive arrangement embodying the principles of the present invention.

DESCRIPTION OF THE PREFERRED EMBODIMENT

The present invention will now be described below by way of example only with reference to the accompanying drawing.

In the drawing, reference numerals $1a$ and $1b$ denote hydraulic circuits for the left and right hydrostatic transmissions in which pumps $2a$ and $2b$ are connected with motors $3a$ and $3b$ in closed loops, respectively. The closed loops further comprise shuttle valves $4a$, $4b$ and charge circuits 5a, 5b, respectively, and they are identical in construction.

In both the shuttle valves 4a and 4b, the arrangement is made such that a higher fluid pressure in each of the closed loops is taken out through outlet ports 6a and 6b, respectively. A charge pump 7 is provided which is connected to the aforementioned charge circuits 5a and 5b.

Reference numeral 8 denotes a synchronizing valve, 9 a valve body thereof, 10 a valve spool, and 11 a piston. The spool 10 and the piston 11 are coaxially fitted in the bore of the valve body with one of ends thereof kept contact with each other. In the positions where the spool 10 is mounted, there are a first annular recess 12, a second annular recess 13 and a third annular recess 14 formed therein. The outlet port 6b of the shuttle valve 4b of the right-hand hydraulic circuit 1b is connected with the first recess 12, whilst the outlet port 6a of the shuttle valve 4a of the left-hand hydraulic circuit 1a is connected with the second recess 13. Further, the third recess 14 is connected through a change-over valve 15 with the charge pump 7.

The spool 10 has formed thereon an annular groove 10a which selectively communicates the first and second recesses 12 and 13. The spool 10 is biased by means of a first spring 16 towards the piston 11 and allows communication between the first and second recesses through the annular groove 10a. Further, the spool has formed therein a small passage 17 adapted to allow the first and second recesses 12 and 13 to communicate with each other over a predetermined stroke of the spool 10 when the first recess 12 is disconnected from the second recess 13 by a valve land 22 against the biasing force of the spring 16. The end face of the spool 10 on the side of the piston 11 communicates with the third recess 14.

The piston 11 is biased by a second spring 18 in the direction away from the spool 10. Further, the other end of the piston 11 communicates with an actuating chamber 19 in which a fluid pressure is introduced to urge the piston 11 towards the spool 10 against the biasing force of the second spring 18. The actuating chamber 19 is connected through a shuttle valve 20 with the outlet ports 6a and 6b of the shuttle valves 4a and 4b of the hydraulic circuits 1a and 1b, respectively. Though the above-mentioned movement of the piston 11 will cause a movement of the spool 10 against the biasing force of the first spring 16, the amount of movement of the spool 10 caused by the piston 11 at that time is limited to such an extent that the small passage 17 communicating the first and second recesses 12 and 13 is not closed by the valve land 22.

The change-over valve 15 interposed between the third recess 14 of the synchronizing valve 8 and the charge pump 7 has a drain position 15a where the third recess 14 is connected with the drain and a communicating position 15b where the third recess 14 is connected with the charge pump 7. The change-over valve 15 has operating levers 21a and 21b, connected to steering valves 23a and 23b, respectively, which are part of a steering control circuit 21 which is interlocked with a steering lever not shown.

The arrangement is made such that when the steering lever is operated, the change-over valve 15 will assume its communicating position 15b, and when the vehicle is driven straight it will assume its drain position 15a.

In the foregoing arrangement, when the vehicle is making a straight run without any steering operation, the change-over valve 15 will assume its drain position 15a where the third recess 14 of the synchronizing valve 8 is allowed to communicate with the drain so that the spool 10 may be held by the first spring 16 under the condition shown. Under such a condition, even if the pressure in the hydraulic circuits 1a, 1b of the left and right hydrostatic transmissions on high pressure side thereof is increased by the running of the vehicle, both the spool 10 and the piston 11 will be held under the condition shown when the urging force caused by the pressurized fluid in the actuating chamber 19 is lower than the resultant of the first and second springs 16 and 18 so that the high pressure sides of the left and right hydraulic circuits 1a and 1b are allowed to communicate with each other by way of the first and second recesses 12, 13 of the synchronizing valve 8 and the annular groove 10a to thereby enable the high pressure sides of both the hydraulic circuits 1a and 1b to be balanced or kept at the same pressure thus keeping the vehicle under a straight run condition.

In the case where the urging force by the pressurized fluid in the actuating chamber 19 introduced from either one of the hydraulic circuits 1a and 1b on high pressure side thereof becomes higher than the biasing forces of the first and second springs 16 and 18; that is, for example, when the vehicle is running on a slope with a high fluid pressure generated in one of the hydraulic circuits, the spool 10 is moved by an amount corresponding to the movable distance of the piston 11 against the biasing force of the first spring 16 to thereby cut off the communication between the first and second recesses 12 and 13 by way of the annular groove 10a and allow the recesses 12 and 13 to intercommunicate only by way of the small passage 17. As a result, the high pressure sides of both the hydraulic circuits 1a and 1b are allowed to intercommunicate under the condition that the pressurized fluid flow is restricted by way of the small passage 17. Therefore, the pressurized fluid in the left and right circuits on the high pressure side is transferred gradually from the high load side to the low load side to thereby enable the fluid pressure to be kept under balanced condition.

Whilst, in the case steering operation is made, the change-over valve 15 is switched from its drain position 15a to its communicating position 15b thereby to allow the pressurized fluid from the charge pump 7 to be introduced in the third recess 14 thus moving the spool 10 to the end of its stroke against the biasing force of the first spring 16. Thus, the small passage 17 is closed by the valve land 22 to cut off the communication between the first and second recesses 12 and 13 thereby rendering the left and right hydraulic circuits 1a and 1b independent from each other. Therefore, during the steering operation, the left and right hydraulic circuits 1a and 1bare automatically put under steering condition simultaneously with the commencement of the steering operation regardless of the values of the pressures in the left and right hydraulic circuits on the high pressure side thereof, and therefore the steering operation can be conducted smoothly.

Since the present invention is constructed as mentioned in detail hereinabove, when the steering of the vehicle is made, the left and right hydraulic circuits 1a and 1b are each rendered operative as an independent transmission so that the steering operation can be made smoothly. Further, not only when the vehicle is making a straight run under a light load condition without any steering operation, but also when one of the hydraulic circuits is under a high load, the vehicle can be run straight on, and further since the mechanical arrangement is not employed in this system, the construction of the hydrostatic drive arrangement can be simplified, and so the cost thereof can be reduced considerably.

It is to be understood that the above description is by way of example only, and that details for carrying the invention into effect may be varied without departing from the scope of the invention claimed.

We claim:

1. A hydrostatic drive arrangement for a vehicle, comprising:
   a pair of variable speed hydrostatic transmissions each having a hydraulic pump, a hydraulic motor and a closed loop hydraulic circuit interconnecting said pump and said motor for communicating fluid therebetween;
   synchronizing valve means interconnected between said hydraulic circuits of said transmissions normally permitting interflow of fluid through first passage means between said hydraulic circuits for synchronizing the output speeds of said transmissions when the fluid pressure in said hydraulic circuits is below a predetermined value, said synchronizing valve means being responsive to fluid pressures in said hydraulic circuits to restrict interflow therebetween through restricted second passage means when the fluid pressure in one of said hydraulic circuits exceeds said predetermined value;
   a hydraulic charge pump connected with said closed loop hydraulic circuits for replenishing fluid lost from said hydraulic circuits; and
   selector valve means disposed between said hydraulic charge pump and said synchronizing valve means for selectively communicating said synchronizing valve means normally blocking communication between said synchronizing valve means and said hydraulic charge pump and establishing communication between said synchronizing valve means and the drain thereby permitting interflow of fluid between said hydraulic circuits, and means responsive to a steering operation of the vehicle to establish communication between said synchronizing valve means and said hydraulic charge pump thereby blocking interflow of fluid between said hydraulic circuits.

2. A hydrostatic drive arrangement as recited in claim 1 wherein said synchronizing valve means comprises a spool operatively associated with said first passage means, said second passage means being formed in said spool for providing a restricted passage therethrough and first spring means resiliently urging said spool to an open position permitting fluid flow through said synchronizing valve means.

3. A hydrostatic drive arrangement as recited in claim 2 wherein said synchronizing valve means further comprises means for providing an actuating chamber, a piston slidably mounted in said actuating chamber, and means for providing an auxiliary flow path for transmitting fluid under pressure from said one hydraulic circuit to said actuating chamber thereby moving said spool via said piston to a restricted flow position against the bias of said first spring means for blocking fluid flow through said first passage means but permitting fluid flow through said second passage means when the fluid pressure in said one hydraulic circuit exceeds said predetermined value.

4. A hydrostatic drive arrangement as recited in claim 3 wherein said first passage means includes a bore formed in said valve means and a pair of ports individually communicating said bore with said closed loop hydraulic circuits.

5. A hydrostatic drive arrangement as recited in claim 4 wherein said synchronizing valve means further includes an auxiliary port communicating said bore with said selector valve means.

* * * * *